United States Patent Office 2,919,561
Patented Jan. 5, 1960

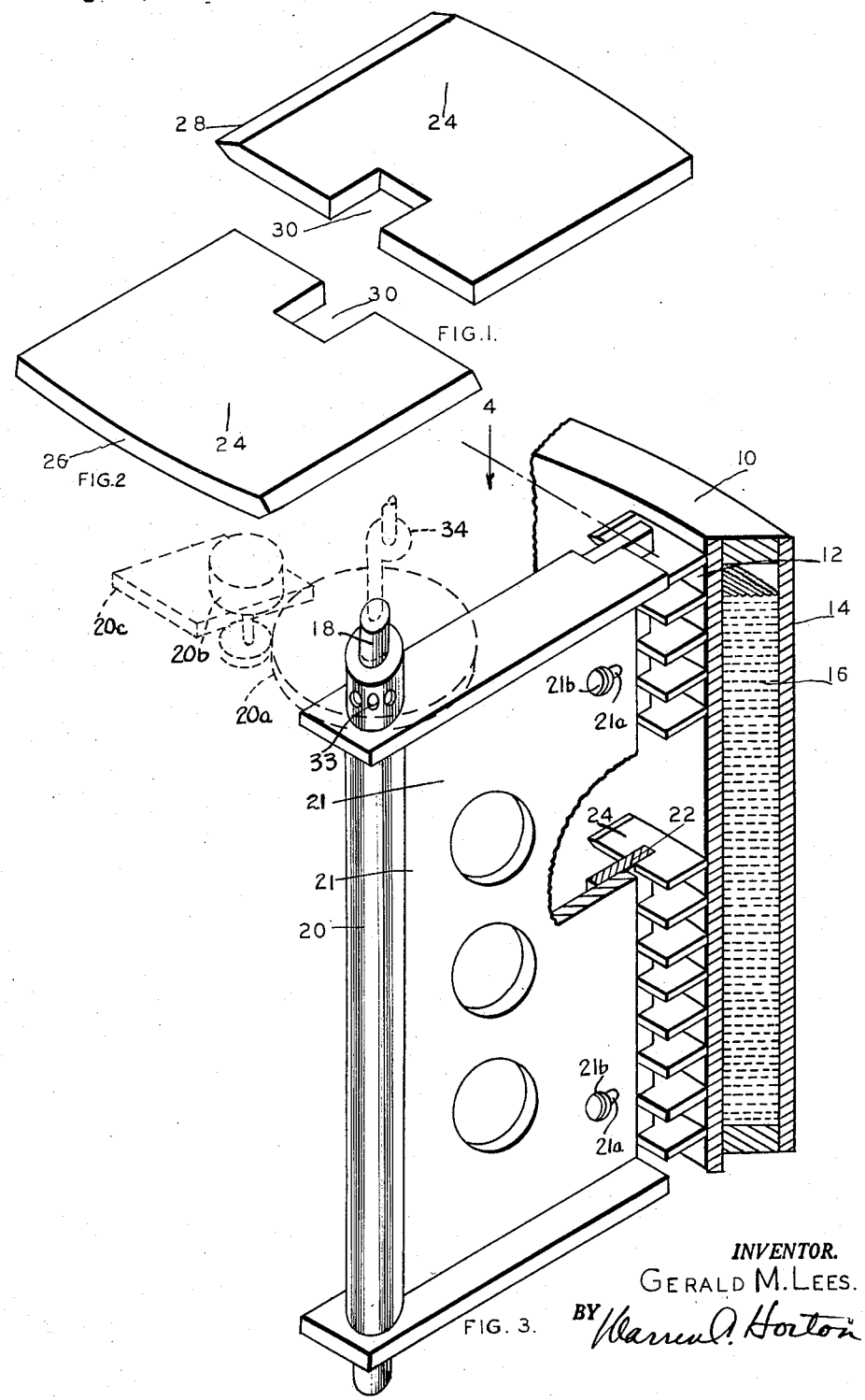

2,919,561

ICE HARVESTING MEANS FOR FLAKED ICE MACHINES

Gerald M. Lees, Chicago, Ill.

Application August 31, 1954, Serial No. 453,341

7 Claims. (Cl. 62—354)

My invention relates to ice harvesting means for removing ice from the freezing surface of ice making machines of the type making flaked or chipped ice as distinguished from snow ice, cube ice or block ice.

More particularly, my present invention relates to improvements in the ice harvesting means for cylindrical ice making machines of the type described in my United States Letters Patent No. 2,659,212, issued November 17, 1953 on my application.

In machines of the type described in that patent, a primary object is to remove the ice in flakes or chips rather than in a powdered, crushed or snow-like form in order to avoid objectionable packing or bridging of the ice in bins or containers and also to avoid obstruction or clogging of drums, pipes or conduits.

While the ice harvesting means of my Patent No. 2,659,212 are relatively good in removing ice from the freezing surface with a minimum amount of crushing or powdering of the ice, some is bound to occur since the ice blades of the machine shown in that patent first score the ice from its outside surface and then gradually penetrate the ice toward the freezing surface, thence to wedge it from the freezing surface by means of an angled portion of the blades progressing along the lines of score around the freezing surface. The preliminary scoring of the ice and its gradual penetration from its outer surface does produce some snowing or crushing of the ice in the course of penetration of the ice sheet during rotation of the ice blade carrying shaft.

Moreover, the ice harvesting means there disclosed are relatively expensive to make and require considerable care to install them accurately positioned to perform their function.

In addition to Patent No. 2,659,212 issued on my application, there are several others broadly of the same type including, for example, Short Patent No. 2,310,468, and Lessard and Lees Patent No. 2,585,020, in each of which the ice is frozen on the inner surface of a cylinder which forms a wall of the refrigerant chamber.

In each of these types of ice machines, the ice is harvested by blades which travel, at least in part, parallel to the surface on which the ice is frozen and which exert a force on the ice substantially at right angles to the direction of travel for removal of the ice from the drums. In all of such machines with which I am familiar, the ice is frozen on the inner surface of the drum and the ice harvesting blades first penetrate the surface of the ice compressing the ice sheet until the blade reaches maximum penetration substantially adjacent the freezing surface. In penetrating the ice sheet, small chips and ice snow are made which are highly objectionable. Furthermore, in all such machines of which I am aware, the ice harvesting blades are expensive and difficult to manufacture and mount upon the machine, and hence require skill and time-consuming care in the manufacture of such machines. Such parallel motion blades most commonly in commercial use are so mounted and configured that the leading portion is outside the ice sheet and the rear end of the blade intersects to practically the full thickness of the ice sheet. As the blade advances, parallel to the sheet past a point in the ice, greater and greater depths of the ice are intersected by the blade. After the penetration is made, the blade of some of the machines takes a different angle with respect to its direction of motion which causes it to push on the shelf of ice formed above or below the blade by its penetration, thus shearing the bond. Such parallel travel blades must have a change of direction relative to the ice sheet, the edge must turn or run into the steel wall of the freezing surface. To effect this change of direction, some of the blades are made integrally including a bend or turn in the blade itself. Others of such blades require multiple parts which must be assembled to effect a similar purpose. Construction of such blades requires a number of manufacturing operations including multiple cut-offs and grinding operations in order to make the turn or angle of the blades and also to make the cutting edge relative to the body of the blade. Moreover such blades exert a direct radial load on the rotor bearings shortening bearing life and complicating design.

It is an object of my present invention to avoid scoring the outer surface of the ice sheet before the actual removal of ice from the freezing surface commences, and thus to obtain a maximum harvest of chipped or flake ice free of snow or tiny flakes.

It is a further object of my invention to provide ice removing blades for a flake ice machine which will exert no direct radial load on the rotor bearings which may be made with a minimum of manufacturing operations and in which the cutting edge may be formed on a single bar of steel before cutting off the blades as individual pieces. At the time such blades are cut off they are complete and ready for installation on the blade carrying bar. This decreases substantially the cost of the ice harvesting means and makes it possible to install such blades with a minimum of time and effort and to replace such blades easily and quickly either individually or by replacement of the bar carrying a plurality of blades as a unit.

A further advantage of my present ice harvesting means is that the surface of the cylinder need not be so accurately machined as is required in the case of an angled blade which first penetrates and then turns to wedge the ice away from the freezing surface. The machining of the surface of such cylinders to the high degree of accuracy now required is both expensive and time-consuming.

The principle of my present invention, and suitable means for carrying it out and putting it to practical use, are hereinafter described, and are illustrated in the accompanying drawings.

In the drawings:

Fig. 1 is a perspective view of a single blade of my invention, looking at the blade from above and back of the rear left corner thereof;

Fig. 2 is a perspective view of the blade turned both laterally and longitudinally from that shown in Fig. 1;

Fig. 3 is a perspective view, partly in section, showing the mounting of a plurality of blades relative to the blade rotating shaft and the cylindrical ice freezing surface;

Fig. 4 is a top view of a blade, looking generally in the direction of the arrow 4 in Fig. 3, showing its mounting means and the ice freezing surface in section and showing the forward end of the blade entering the ice sheet;

Figure 5:
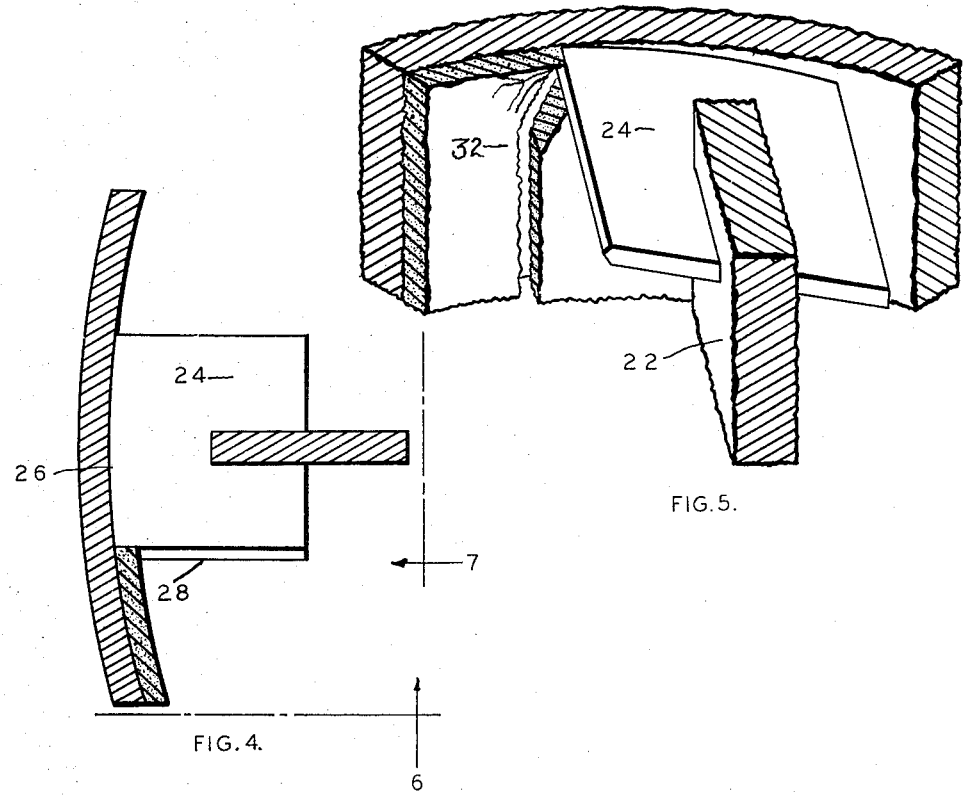
Fig. 5 is a side perspective view of the ice blade and its relative position to fragmentary portions of the blade carrier, the ice sheet, and the freezing surface.
Figure 6:
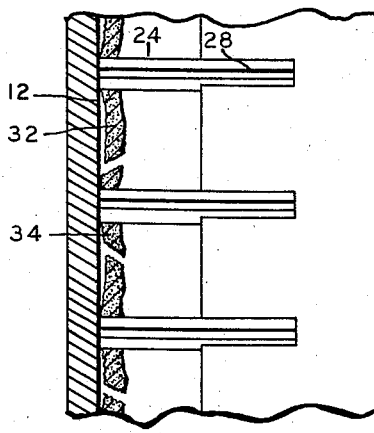
Fig. 6 is a perspective showing a plurality of blades looking generally in the direction of the arrow 6 in Fig. 4; and, Fig. 7 is a fragmentary perspective view of a plurality of blades and looking generally in the direction of the arrow 7 in Fig. 4.

While the drawings illustrate fully the portions of a flaked ice machine relating to my present invention, I shall describe such a machine generally so that the environment in which the portions shown in the drawings are to be found will be clearly understood.

Such machines generally comprise a base having an open-ended cylinder vertically mounted thereon. The cylinder has an outer wall and an inner wall providing a hollow chamber therein for containing refrigerating fluid. Suitable valves and conduits connect said inner chamber to a compressor with appropriate pump means and controls for carrying out the refrigeration cycle. The outer wall of the vertical cylinder carries insulating material on its outer surface and the inner wall provides an inside freezing surface. Means are provided for flowing water over the inner freezing surface of the cylinder upon which it is frozen as a sheet of ice. In such machines an upright shaft mounted vertically on the base is driven by an electric motor to rotate a blade carrying arm which carries the blades around the inner surface of the cylinder removing ice therefrom during its travel. Usually also means are provided to interrupt the flow of water upon the freezing surface just before and just after the blades travel thereover, it being desirable that the harvested ice be substantially free of unfrozen water.

For the particular ice harvesting means of my present invention I use a vertical shaft 20 mounted on a base as previously described. A motor driven gear 20a is mounted at the top of said shaft as at 18 and keyed thereto. A motor 20b is provided for rotating the shaft, through the gear 20a. The motor may be mounted on a suitable element 20c supported on any fixed portion of the structure, such as the cylinder 10.

I have indicated a section of the cylinder 10 to which I have previously referred. This has an inner vertical wall 12 the inner surface of which is the freezing surface of the cylinder. The outer wall 14 of the cylinder 10 provides a chamber in combination with the other walls for containing a refrigerant 16. Extending laterally from the shaft 20 toward the inner surface of the cylinder 10 is a steel web 21 rigidly mounted on the shaft 20 to be rotated therewith and adapted to carry the blade carrying bar 22.

The blade carrying bar and the blades mounted thereon which comprise the essential parts of my present invention will now be described.

Figure 7:
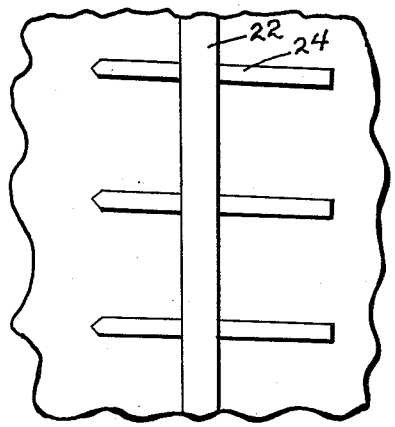

The blade bar 22 is made from flat stock and has at one edge a series of notches equal in number to the number of blades to be mounted thereon. Such edged notches are angled slightly from the horizontal as illustrated particularly in Fig. 5 and Fig. 7 so as to carry the individual blades, which may desirably have matching notches as shown in Fig. 1 and Fig. 2, at a slight angle to the horizontal. When mounted on the blade bar, the leading edge of each blade is slightly higher than the trailing edge of the blade as appears in Fig. 5 and Fig. 7. The blades 24 are made from flat stock and have an outer edge 26 curved on such a radius as to be parallel with the inner face of the cylinder wall 12. Each blade 24 has a leading edge 28 which edge may be ground on one or both sides to provide a knife edge for penetrating the ice sheet. This may be formed on a piece of stock before individual blades are cut therefrom. Each blade may be provided at its inner edge about midway of the blade with a slot 30 to match the slot previously described on the blade bar 22.

The blades are mounted on the blade bar 22 as appears in Fig. 3, and extend substantially the same distance as that from the top of the ice freezing surface to the bottom thereof.

As is shown particularly in Fig. 4, the edge 26 of each blade 24 conforms closely to the inner surface of the cylinder 10 and by its particular mounting on the blade bar 22 as previously described has a slight tilt to the horizontal as shown in Fig. 5.

The blade 24 does not first score the surface of the ice and penetrate it toward the inner wall of the cylinder. On the contrary, it penetrates the ice sheet only in the direction of travel of the blade parallel to the surface of the cylinder. The blades meet the ice sheet edge on and bear circumferentially thereagainst. There is no radial or outward application of force. I have found that the compression of the ice sheet ahead of the blades results in a breaking of the bond with the freezing surface for a distance of up to six inches ahead of the blades. The effect of the knives on the already severed ice sheet is simply to cut the sheet into the properly sized fragments. The effect of the knives is thus twofold. In addition to this last function of breaking up the ice sheet, the knives, considered in assembly, constitute a pushing surface bearing against the edge of the ice sheet. It is by virtue of the fact that ice has appreciable elasticity that this separation of the sheet from the freezing surface occurs.

In conjunction with this phenomenon, two other consequences should be noted. First, the knives need not be sharp on their leading edge. The less sharp they are, the more effective they will be in producing the desired separation of the ice sheet from the freezing surface. On the other hand, some degree of sharpness is desired on the leading edge of the blade in order to break the separated ice sheet up into the desired sized particles without excessive powdering.

Second, the slight pitch of the blades with respect to their line of travel serves the triple function of, first, fragmenting the ribbons of ice formed by the blade from the separated ice sheet; second, tending to scrape the freezing surface clean of any ice chips which may have separated from the body of the ice sheet upon its separation from the freezing surface which adhere to that surface; and third, of increasing the resistance of the ice sheet to the passage of the knives which will of course result in a greater compressive force being transmitted forwardly of the knives to effect the separation of the ice sheet from the freezing surface.

The knives disclosed in my above mentioned Patent No. 2,659,212 should be contrasted operatively. There the force applied to the ice sheet is primarily radial in that the knives progressively are forced increasingly heavily into the ice sheet in the direction of the freezing surface until finally the knives are in contact with that surface. As a result, there is virtually no compression wave traveling ahead of the knives to separate the sheet as a mass from the freezing surface. The actual separation of the ice from the freezing surface is largely accomplished after the scoring by a wedging surface formed on the trailing edge of the blade. Briefly, the blade in my prior invention first cuts the ice into ribbons and thereafter detaches it from the freezing surface and breaks it into fragments. The knives here first detach the ice sheet from the freezing surface and thereafter break the ice up into the desired size fragments. As the blade proceeds, the ice 32 will crack before the knife edge as shown in Fig. 5 breaking the bond with the freezing surface. As the blade progresses in its travel, the ice segment between it and the adjacent blade is compressed between the adjacent blade faces and fractures, the tilted rear portion of the blade will wipe the broken fragments of ice from the surface of the cylinder and such ice flakes 34 will pass out between the rear of the blades and drop by gravity to the bottom of the ice machine.

Since the blade may be mounted on a blade bar quite separate from the other portions of the means driven by the rotating shaft, it will be apparent that the blade bar and the assembly of blades may be made and assembled separately from the rest of the machine, the blade bar being then mounted on the web 21 in any suitable manner and preferably by adjustable means so that it may be adjusted accurately to fit adjacent the sides of the cylinder wall.

The adjustability may be provided by slotting the web 21 transversely as at 21a in that portion thereof against which the blade bar 22 is secured. Bolts 21b may then extend through the slots 21a and appropriate holes in the blade bar to permit an adjustment of the blade bar toward or away from the freezing surface 12.

The specific means for depositing water on the wall 12 for freezing may be as desired, for example, such as that indicated in my prior Patent No. 2,659,212 mentioned, namely spray means 33. The water may be supplied to the spray means by suitable means such as a pump 34.

While I have illustrated and described a specific embodiment of my invention, it will be apparent to those skilled in the art that changes and modifications may be made in size, shape and location of the elements described, without departing from my invention. What I desire to secure and protect by Letters Patent is as defined in the following claims:

1. A blade for removing ice in flakes from a cylindrical surface, said blade having a leading cutting edge, a cylinder engaging edge, and a mounting edge, said cylinder engaging edge being an arc extending substantially the length of said blade and on a radius substantially that of said cylindrical surface and meeting said leading edge at nearly a right angle, and said mounting edge having a medial side slot, the forward and rear walls of which are parallel to each other and inclined at an angle other than vertical to the longitudinal plane of said blade.

2. A blade assembly for removing ice in flakes from a freezing surface by relative movement therebetween and comprising a bar having a plurality of parallel slots at one side thereof, said slots being inclined from the horizontal relative to the longitudinal axis of said bar, a plurality of blades mounted in said slots and extending laterally therefrom, each of said blades having a leading beveled cutting edge in a plane substantially normal to said surface and parallel to and forward of said bar and a trailing edge extending rearwardly of said bar.

3. A blade assembly for removing ice in flakes from a freezing surface by relative movement therebetween and comprising a bar having a plurality of parallel slots at one side thereof, said slots being inclined from the horizontal relative to the longitudinal axis of said bar, a plurality of blades mounted in said slot and extending laterally therefrom, each of said blades having a leading beveled cutting edge in a plane substantially normal to said surface and parallel to and forward of said bar, a trailing edge extending rearwardly of said bar and a mounting edge having a notch therein, the parallel sides of which are inclined relative to the face of said blade at angles matching that of the slot in said bar.

4. In a flaked ice making machine having an ice freezing face on the inner surface of a cylindrical freezing unit and means to supply water thereto to form an ice surface thereon, ice harvesting means comprising blade carrying means, a plurality of ice removing blades mounted thereon in spaced parallel relation to each other, the forward end of each blade being a forwardly tapering cutting edge substantially radial with respect to said face and extending substantially to said face, one side of each blade being rounded substantially on the same radius as said inner surface of said freezing unit and mounted closely adjacent thereto, said blades being mounted on said blade carrying means at an angle to the horizontal such that the knife edge and the opposite end of each blade circumscribe separate but parallel planes when rotated within said cylindrical freezing unit, and means to cause relative rotary motion between said freezing unit and said blade carrying means whereby said blades pierce an ice sheet formed on said freezing unit in a direction parallel to the freezing face thereof thereby removing the ice therefrom in the area traversed by said blades.

5. In a flaked ice making machine having an ice freezing face on the inner surface of a cylindrical freezing unit and means to apply water thereto for freezing, ice harvesting means comprising blade carrying means, a plurality of ice removing blades mounted thereon in spaced parallel relation to each other, the forward end of each blade being a forwardly tapering cutting edge substantially radial with respect to said face and extending substantially to said face, one side of each blade being rounded substantially on the same radius as said inner surface of said freezing unit and mounted closely adjacent thereto, said blades being mounted on said blade carrying means at an angle to the horizontal such that the knife edge and the trailing edge of each blade circumscribe separate but parallel planes when rotated within said cylindrical freezing unit, and means, upon which said blade carrying means is adjustably mounted for radial movement, to cause relative rotary motion between said freezing unit and said blade carrying means whereby said blades pierce an ice sheet formed on said freezing unit in a direction parallel to the freezing face thereof, thereby removing the ice therefrom in the area traversed by said blades.

6. In a flaked ice making machine having an ice freezing face on the inner surface of a cylindrical freezing unit and means to apply water thereto for freezing, ice harvesting means comprising a rotary shaft mounted at the longitudinal axis of said freezing unit, a web extending laterally from said shaft, blade carrying means extending laterally from said shaft and adjustably mounted thereon for radial movement and having a plurality of ice removing blades mounted thereon in spaced parallel relation to each other, the forward end of each blade having a forwardly tapering ice cutting edge substantially radial with respect to said face and extending substantially to said face, the outer edge of each blade being curved in an arc substantially matching the surface of said freezing unit, and means to rotate said shaft to cause relative rotary movement between said freezing unit and said blades, whereby said blades pierce an ice sheet formed on said freezing unit in a direction parallel to the freezing face thereof for removing ice from said freezing unit.

7. A blade assembly for removing ice from the inside face of a cylindrical freezing unit comprising a blade carrier, means on one edge of said blade carrier mountable axially within said unit, a plurality of parallel blades extending laterally from said blade carrier, each of said blades having a forwardly tapering forward cutting edge in a plane substantially normal to said face and parallel to and forward of the plane of said blade carrier, said cutting edge extending substantially to said surface.

References Cited in the file of this patent

UNITED STATES PATENTS

| | | |
|---|---|---|
| 1,020,759 | Holden | Mar. 19, 1912 |
| 1,068,731 | Blum | July 29, 1913 |
| 1,380,777 | Cox | June 7, 1921 |
| 2,259,841 | Spiegl | Oct. 21, 1941 |
| 2,535,462 | Stoelting | Dec. 26, 1950 |
| 2,585,020 | Lessard | Feb. 12, 1952 |
| 2,585,021 | Lessard | Feb. 12, 1952 |
| 2,590,966 | Heller | Apr. 1, 1952 |
| 2,659,212 | Lees | Nov. 17, 1953 |
| 2,683,357 | Albright | July 13, 1954 |
| 2,712,734 | Lees | July 12, 1955 |
| 2,716,869 | Lees | Sept. 6, 1955 |
| 2,735,275 | Branchflower | Feb. 21, 1956 |